Figures 1, 1A:
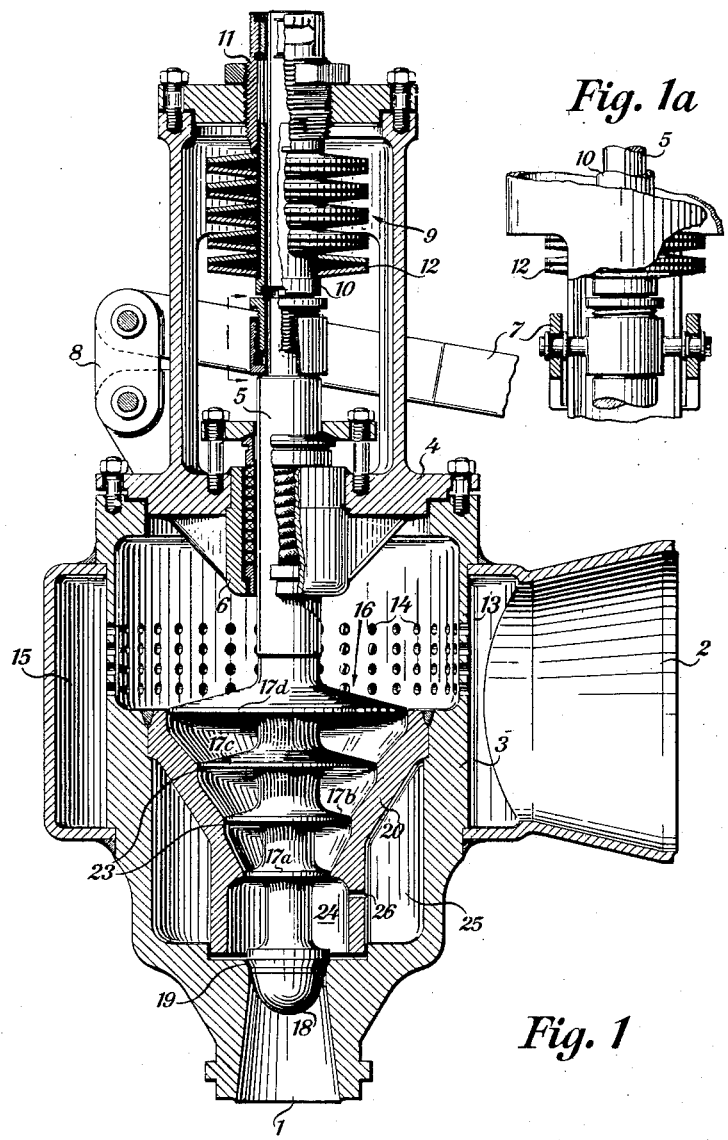

March 29, 1966 R. BECK 3,243,157
REDUCING VALVES
Filed June 11, 1962 3 Sheets-Sheet 1

INVENTOR.
RUDOLF BECK
BY Bair, Freeman & Molinare
Attys.

March 29, 1966   R. BECK   3,243,157
REDUCING VALVES
Filed June 11, 1962   3 Sheets-Sheet 2

INVENTOR.
RUDOLF BECK
BY Bair, Freiman & Molinare
Attys.

United States Patent Office 3,243,157
Patented Mar. 29, 1966

3,243,157
REDUCING VALVES
Rudolf Beck, Konigstein, Taunus, Germany, assignor to Hans J. Zimmer Verfahrenstechnik, Frankfurt am Main, Germany, a company of Germany
Filed June 11, 1962, Ser. No. 201,706
Claims priority, application Germany, June 14, 1961, Z 8,803; Nov. 9, 1961, Z 9,054
3 Claims. (Cl. 251—122)

This invention relates to a reducing valve for flowing media having a throttling member displaceable with and arranged rearwardly (in the direction of flow) of the closing member of the valve to define together with an inner member of the valve a pressure-relieving chamber. Such reducing valves are of particular value in high pressure plants for reducing the pressure and adjusting the throughput quantities for gases and vapours.

If in reducing valves a certain ratio, termed herein "the critical pressure ratio," between the initial pressure and the final pressure is exceeded in the smallest flow opening in the region of the valve seat, its value being dependent upon the temperature prevailing there, the flowing gases and vapours reach the speed of sound. At this speed of flow the throughput reaches the maximum value for a predetermined free cross-sectional area of the opening. In the interests of economic dimensioning of the valves therefore it is desirable to maintain the pressure ratio in the critical range or near the critical range also in the case of valves having a regulatable throughput. The fulfilling of this requirement also has the further advantage that only comparatively small adjusting forces are required for the actuation of the valve. This is of particular importance for automatically controlled valves as the use of substantially smaller adjusting motors is possible.

Reducing valves are already known in which the throughput is varied by means of a regulating cone of paraboloidal form arranged at the lower end of the valve spindle to extend forwardly of the closing member of the valve, in the direction of flow, and to co-operate with the valve seat and in which the pressure reduction is effected according to the principle of the Laval nozzle in an enlargement of the chamber behind the closing member. It is true that use may be made in such valves of the most favourable conditions of flow which arise at the speed of sound but these most favourable conditions only arise for the predetermined maximum throughput for which the Laval nozzle has been designed. Upon departures from this predetermined condition of operation, that is to say upon diminution in the throughput, sonic oscillations and vibrations are set up which give rise to uncontrollable stressing of the valve and conduit parts and to an intolerable noise.

In order to overcome this disadvantage, it has already been proposed to decrease the initial pressure stepwise. For this purpose there is employed a throttling member arranged on the closing member and consisting of several plate-like throttling steps arranged in spaced relation along the valve spindle, the diameters of the steps increasing linearly as seen in the direction of flow. The containing surface of the throttling member of this known construction of valve, therefore, has essentially the shape of a plain circular cone and the member is surrounded by a correspondingly shaped inner member of the valve. When the valve is opened, the geometrical shape of the throttling member and of the co-operating inner member of the valve results at each adjustment of the lift of the valve, in a linear increase in area of the cross-sectional area of the opening from one throttling step to another. This linear increase in area leads however to differing pressure ratios and thus to differing speeds of flow at the individual throttling steps. Therefore even with the known valves with a stepped cone the disadvantages already mentioned become apparent.

The same applies also to a further known valve in which the initial pressure is not reduced step-wise but continuously and in which a throttling member substantially of the shape of a plain circular cone is arranged behind the closing member, in the direction of flow, to be displaceable with the closing member, this throttling member fitting substantially against the inner wall of a correspondingly shaped inner member of the valve when the valve is closed. With this type of reducing valve the adjustment of the throughput is effected by adjustment of the lift of the throttling member relative to the valve seat whereby the free cross-sectional area of the opening and, therefore, the throughput is altered. As, however, with this type of valve also when the valve is opened, the cross-sectional area of the opening of the relieving chamber formed between the throttling member and the inner member of the valve increases in the direction of flow according to a linear function, it is not possible to achieve throttling such that the speed of sound may be achieved at each point in the relieving chamber irrespective of the degree of lift of the valve.

By this invention the above-mentioned disadvantages of the known reducing valves will be avoided and a reducing valve will be provided which may be furnished with a stepped cone or with a continuously tapering throttling member and with which at each position of opening of the valve (that is to say at each throughput rate of the flowing medium) the same pressure ratio, preferably the critical pressure ratio, will prevail at all the effective cross-sectional areas of the openings of the relieving chamber. By the expression "effective cross-sectional areas of the openings of the relieving chamber" is to be understood, for a valve with a stepped cone, the cross-sectional areas of the openings at the respective throttling steps and, for a valve with a continuously tapering throttling member, the cross-sectional areas of the relieving chamber available at equally spaced points along the axis of the throttling member.

According to the invention the problem is solved by so constructing the throttling member and the inner member of the valve that in each position of opening of the valve effective cross-sectional areas of the openings of the relieving chamber following one another along the axis of the throttling member always bear a constant ratio to each other. In this way it is ensured that the sequential cross-sectional areas of the openings of the relieving chamber no longer increase linearly but according to a geometric progression. This necessitates that the characteristic curve for each opening, which is determined by the dependence upon the lift of the valve of the free cross-sectional areas of the opening for the time being, shall be the same for all the effective cross-sectional areas of the openings of the relieving chamber. Hence the valve may be so designed, without difficulty, that at each effective position of the relieving chamber, independent of the degree of lift, there will be a constant pressure ratio, preferably the critical pressure ratio. In this way is achieved a reducing valve which avoids the disadvantages of the known reducing valves referred to above and has an extraordinarily wide range of adjustment, extending from the maximum throughput at full lift to a very small throughput when the valve is almost closed, without the desired pressure drop between initial pressure and final pressure for which the valve is designed being altered to any appreciable degree.

According to a first constructional form of the invention, the throttling member is constructed as a stepped cone with several throttling steps of different diameters arranged in spaced relation on the valve spindle and cooperating with an inner member of corresponding shape to the stepped cone and formed with seats for the throttling steps whereby the ratio between the cross-sectional areas of the openings established at any two successive throttling steps is constant.

The cross-sectional areas of the openings may be so dimensioned that at each throttling step there may arise either a critical or a sub-critical pressure drop. Preferably the individual throttling steps equally spaced along the valve spindle so that the stepped cone will have the shape of a body of revolutions whose generatrix is curved. In this case the shape of the inner member of the valve is suited to this shape of the stepped cone.

According to a second constructional form of the invention, the throttling member progressively tapers in the direction of flow and in the closed position of the valve substantially fits to the inner wall of the inner member of the valve, any two adjacent areas of the cross-sectional areas of the relieving chamber which are spaced equally along the axis of the throttling member bearing a constant ratio to each other for any position of adjustment of the valve.

Such a constructional form has the additional advantage, compared with the first-mentioned constructional form, of reduced valve dimensions, especially for large pressure drops, because the outer dimensions of the relieving chamber follow the tapering inner wall of the inner member of the housing which in turn corresponds to the tapering of the throttling member in the direction of flow whereas with a valve having a stepped cone the last throttling step, due to the geometric increase in size of the cross-sectional areas, already requires a housing of considerable dimensions. The surprisingly small dimensions of the valve according to the second constructional form of the invention, even for very high throughputs and pressure gradients, result not only from the progressive reduction in the outer dimensions of the relieving chamber in the direction of flow but are also made possible because the speed of flow is the same at all points of the relieving chamber which, particularly when this speed is the speed of sound, permits of very high throughputs. To this must be added a large throughflow number $\alpha$ attributable to the smooth stepless widening of the relieving chamber, which still further improves the through flow as this, as is known, is directly proportional to the throughput.

For certain fields of application it may be desirable to be able with each of the constructional forms of the reducing valve according to the invention to effect simultaneously with the pressure reduction a cooling of the flowing medium by the injection of a second medium or to effect, quite generally, a mixing of the flowing medium with a second medium. With advantage, in this case, the second medium is introduced into a zone at the highest possible pressure and for this purpose it is arranged that inlets for an injection fluid open into the relieving chamber.

Further details and advantages of the invention will be more clearly described below with reference to examples of construction and by reference to the accompanying drawings.

Figure 2:
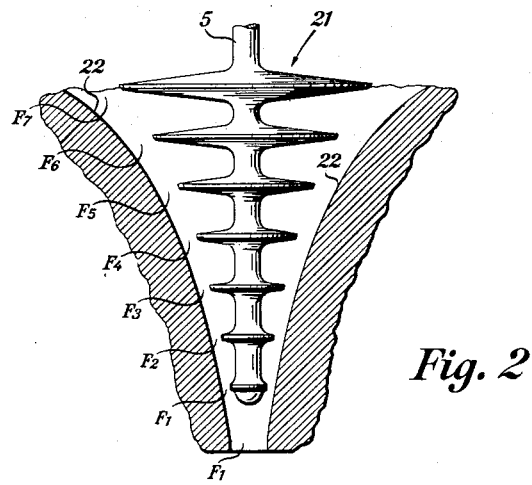
Figure 4:
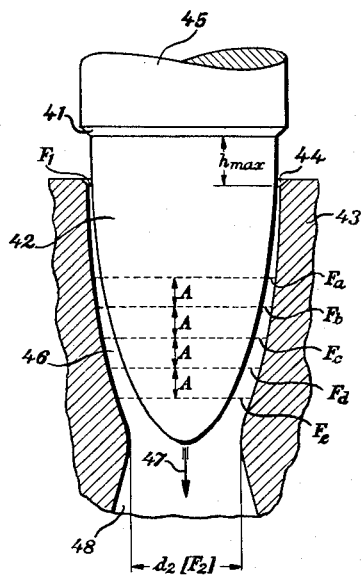
Figure 5:
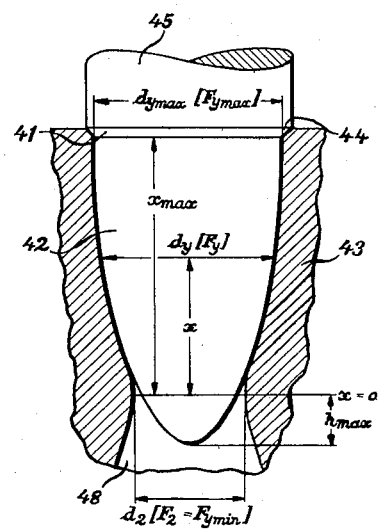
Figure 3:
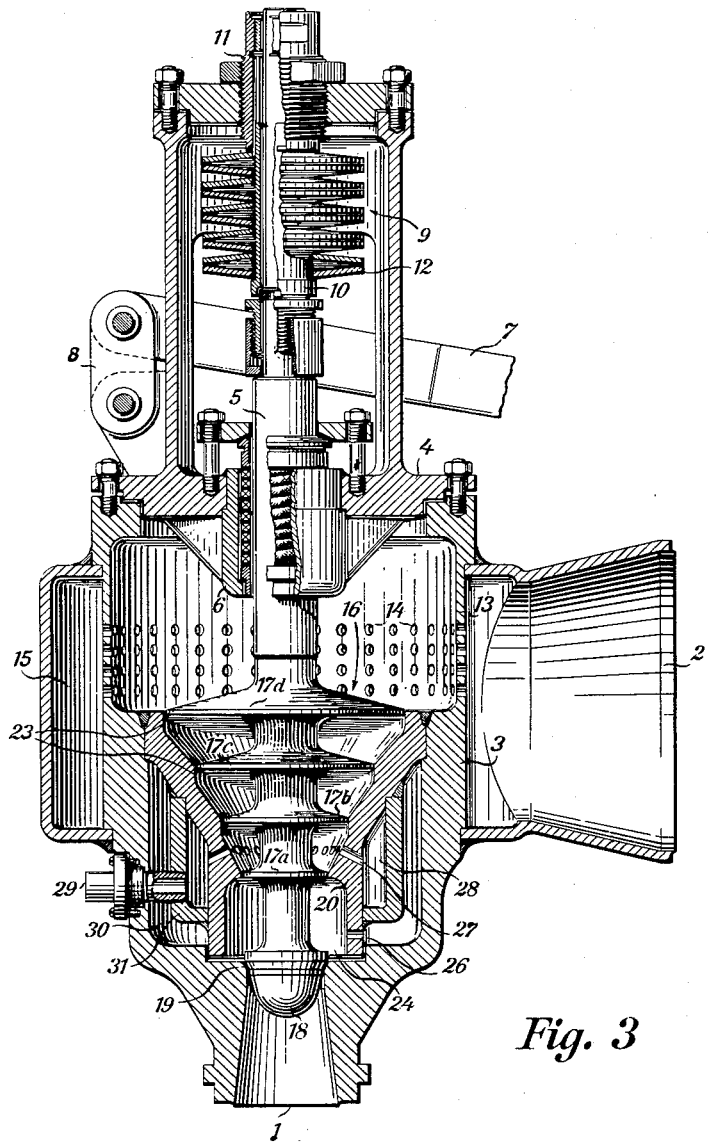

In the drawings:

FIGURE 1 is a vertical section of a reducing valve according to the invention having a stepped cone, FIGURE 1a is a fragmentary side elevation of the upper part of the valve according to FIGURE 1, FIGURE 2 is a diagrammatic representation of a stepped cone according to the invention, FIGURE 3 is a vertical section of a second example of a reducing valve according to the invention having a stepped cone, FIGURE 4 is a fragmentary section through the neighbourhood of the seat of a valve according to the invention having a continuously tapered throttling member which is shown in the position of maximum opening and FIGURE 5 is a view similar to that of FIGURE 4 with the valve closed.

The valve shown in FIGS. 1 to 3 is an example of the first way of carrying out the invention, i.e., of the constructional form provided with a stepped cone. The valve may be constructed as an elbow valve or as a straight-through valve but is conveniently of the elbow valve type, i.e., with an inlet conduit 1 and an outlet conduit 2 disposed at right-angles to each other. The valve housing has the usual shape with a detachable upper extension 4. The valve spindle 5 extends through the extension 4, a stuffing-box packing arranged in a stuffing box body 6 sealing the valve chamber from the ambient atmosphere while permitting the axial movements of the valve spindle 5. The lifting movements of the spindle 5 are produced, in the example illustrated, by means of a bifurcated lever 7 the forked end of which is articulated to the extension 4 by means of an intermediate link 8 and is pivotally connected to the valve spindle. These movements of the spindle 5 are effected against the loading of a spring 9 which bears at one end, through a sleeve 10, against the valve spindle and at the other end, through a guide bush 11, against the extension 4. In the construction illustrated the spring 9 consists of several superposed dished discs 12 which bear upon each other in the region of their peripheral edges and in the neighbourhood of their inner edges, alternately.

Conveniently, the outlet conduit 2 is not in direct communication with the valve chamber over its whole cross-sectional area with the valve chamber but the latter is closed off from the outlet conduit by means of a circular apertured wall 13 having several radially directed bores 14. The outlet conduit 2 is carried around the valve housing 3 as an annular channel 15 so that the fluid issuing from all the bores around the apertured wall 13 can flow into the outlet conduit 2.

The stepped cone 16 according to the invention comprises several plate-like throttling steps 17a, 17b, 17c, 17d, arranged in spaced apart relationship upon the valve spindle 5. The regulating cone 18 on the lower end of the spindle 5 forms the first throttling step, the seat 19 for which is provided also for effecting tight closing off of the inlet conduit 1. The stepped cone 16 co-operates with an inner member 20 the shape of which is suited to that of the cone 16.

According to the invention the individual throttling steps 17a, 17b, 17c, 17d and the inner member 20 are so dimensioned that the ratio between the cross-sectional areas of the annular gaps opened up by any two successive throttling steps will remain constant irrespective of the degree of lift of the valve spindle. FIG. 2 illustrates, by way of example and in a diagrammatic manner, a stepped cone 21 according to the invention together with the inner surface 22 of the inner member. The stepped cone 21 exhibits seven throttling steps arranged at a uniform spacing. According to the invention the diameters of the throttling steps, considered in the direction of flow of the fluid, do not increase linearly but according to a curve in such fashion that for any desired degree of lift of the valve spindle the increase in the cross-sectional areas of the free openings $F_1$ to $F_7$ occurs according to a geometrical series. The relationship may be written:

$$\frac{F_1}{F_1^1}=\frac{F_1^1}{F_2}=\frac{F_2}{F_3}=\frac{F_3}{F_4}= \ldots =a=\text{constant}$$

From this we have:

$$F_1=a.F_1^1$$

$$F_1^1=a.F_2$$

$$F_2=a.F_3 \ldots \text{etc.}$$

The stepped cone having five throttling steps shown in FIGS. 1 and 3 is also constructed according to this law, the inner surface of the inner member 20 being formed with intermediate surfaces 23 which each constitute a seat for a respective one of the throttling steps 17a, 17b, 17c, 17d. The distance between the first throttling step constituted by the regulating cone 18 and the second throttling step 17a, in the examples shown in FIGS. 1 and 3, is greater than the uniform distance apart of the other steps 17a to 17b. The annular chamber 24 formed between the first and second throttling steps is so dimensioned that with the mxaimum throughout of fluid and with full lift of the valve spindle, the free cross-sectional area rendered available for the flow is greater than the maximum free cross-sectional area of the opening afforded by the regulating cone 18, whereby critical or sub-critical pressure ratios are excluded.

The funnel shape of the inner member 20 results in the formation of an annular hollow space 25 between the inner member 20 and the wall of the valve housing 3. Suitably, a bore 26 is formed through the wall of the inner member 20 to inter-connect the annular chamber 24 and the space 25 so that when the valve is open the pressures in these will be equalised. Thus the inner and outer surfaces of the inner member 20 are loaded with approximately equal pressures so that the wall of the member may be made of comparatively low strength.

In the example shown in FIG. 3 the shapes of the valve and of the stepped cone correspond with those in the example shown in FIG. 1. In addition to the advantageous action achieved by means of the invention, provision is made in this reducing valve for the possibility of effecting, simultaneously with the pressure reduction, a cooling of the gas or vapour by the injection of a second fluid. For this purpose a ring of nozzles composed of several generally radially directed bores 27 is formed in the wall of the inner member 20 preferably (as shown) between the second and third throttling steps 17a, 17b. The bores 27 establish a connection with a space 28 into which opens a second supply conduit 29 that passes through the wall of the valve housing 3. The space 28 is the inner and a space 30 is the outer of two concentric annular spaces formed from the space 25 shown in FIG. 1 by the insertion therein of an annular wall 31, the space 30 taking over the function of the space 25 of FIG. 1. The supply conduit 29 is particularly suitable not only for the supply of a cooling fluid but also for the admixture of another fluid. The turbulence arising in the course of the pressure reduction assists in improving the mixing of the two fluids.

In order to achieve the smallest possible dimensions for the reducing valve, the stepped cone and the inner member are preferably dimensioned for the maximum throughput at the critical or approximately the critical pressure ratio. For a predetermined maximum throughput, the sizes of the stepped cone and of the inner member of the valve are determined by the cross-sectional area of the opening afforded by the first throttling step. This again is dependent upon the pressure ratio selected. It is most economical therefore so to construct the reducing valve that the cross-sectional area of the opening of the first throttling step is made as small as possible.

The illustrations of FIGS. 4 and 5 relate to the second constructional form of the invention, namely, the construction of the valve with a throttling member that tapers in the direction of flow and in the closed position of the valve fits substantially closely to the inner wall of the inner member of the valve. A reducing valve constructed in this manner may also be built as an elbow valve or as a straight-through valve by making use of constructional elements which are themselves known. For the sake of simplicity, therefore, only those parts of the valve are shown in the drawings which are necessary for the understanding of the basic inventive concept.

The obturating cone 41 of the valve is formed, in a manner known per se, as the sloping surface of a truncated cone and is provided at the lower end of a valve spindle 45. The throttling member 42 is arranged coaxially with the obturating cone 41 and progressively diminishes in cross-sectional area in the direction of flow of the fluid through the valve which is indicated by the arrow 47 in FIG. 4. This tapering of the throttling member 42 is effected by a harmonic increase in the curvature of the generatrix of the throttling member, in the direction of flow 47, which is the characteristic of the present invention.

The throttling member 42 is surrounded by the associated inner member 43 of the valve which may be constructed as a fixed component of the valve housing (not shown) or as a removable or non-removable insert secured in the housing. As will be clearly seen in particular from FIG. 5, the throttling member 42, when the valve is in the closed position, fits over the greater part of its length against the inner wall of the inner member 43 of the valve. The inner wall, seen in longitudinal section, therefore has a curvature identical, or substantially identical, with that of the throttling member. In the neighbourhood of the free end of the throttling member the passage through the inner member of the valve reaches its smallest cross-sectional area $F_2$ and then preferably undergoes a transition into an adjoining widening 48 of the flow passage for the fluid. The axial length of the throttling member is so selected, advantageously, that the throttling member (when the valve is closed) will project beyond the narrowest part $F_2$ of the passage through the inner member by a distance corresponding to its full lift $h_{max}$. In this way it is ensured that when the valve is fully open, the throttling member will terminate at the level of the smallest cross-sectional area $F_2$, as can be seen from FIG. 4. At the inlet end of the inner member 43 is disposed the valve seat 44 forming the counterpart to the obturating cone 41 and co-operating with the latter upon shutting of the valve to effect a leakproof closing. With a tight fitting of the throttling member 42 in the inner member 43, or with a tight fitting over part of its length, more importantly in the neighbourhood of the narrowest portion of the passage through the inner member, the obturating cone 41 and valve seat 44 may however be dispensed with.

As can be seen from FIG. 4, the surface of the throttling member 42 and the inner wall of the inner member 43 form a relieving chamber 46 the size of which depends upon the position of lift of the throttling member at the time. The curvature of the surface of the throttling member and of the inner surface of the inner member is so selected in dependence upon the magnitude of the conditions affecting and the type of the flowing medium or fluid that any adjacent two of the cross-sectional areas of the relieving chamber 46 taken in planes at equal distances apart along the axis of the throttling member bear a constant ratio to each other irrespective of the position of the member within its range of travel.

In FIG. 4 annular cross-sectional areas are indicated, by way of example, by broken lines at $Fa$ to $Fe$ which are spaced from each other by the constant distance A between adjacent cross-sections. Corresponding to the foregoing conditions, therefore, the following ratios may be made equal to each other:

$$\frac{F_a}{F_b} = \frac{F_b}{F_c} = \frac{F_c}{F_d} = \frac{F_d}{F_e} = \text{constant}$$

This constant ratio of the cross-sectional areas of the relieving chamber is maintained at all positions of lift, undisturbed by the variations in the absolute values of the cross-sectional areas under consideration brought about by the lifting movements.

In the relieving chamber 46 thus constructed in accordance with the invention the pressure will be reduced logarithmically, without steps, with reference to the proportion of the path which has been travelled by the fluid so that the speed of flow at each point in the relieving chamber will be uniform and preferably corresponds or approximately corresponds to the speed of sound.

The relieving chamber according to the invention permits, with a variable throughput, the almost adiabatic conversion of the entropy of the flowing medium into kinetic energy with a constant pressure ratio between the initial and final pressures within a wide range of control of the throughput. Audio oscillations and the unacceptable noises connected therewith are completely excluded because the initial pressure is converted into energy of flow smoothly down to the value of the counter-pressure without the work area below the critical pressure in the PV diagram being even only partially converted into sound-energy and into any appreciable amount of frictional heat. The characteristic curve for the opening of the valve corresponds very closely to a straight line and has the same shape for all media.

The opening of the valve is effected by movement of the throttling member in a direction opposed to the direction of flow by means of an actuator (not shown) engaged with the valve spindle 43. Small lifting movements at the beginning of the range of lift cause small changes in the annular entry area $F_1$ (FIG. 4) and thus also in the throughput. As the maximum lift is relatively small, the adjusting force to be applied to cause the lifting movements is also thereby considerably reduced which advantageously leads to small actuators for the valve spindle. The dimensions of the relieving chamber may be so chosen that the lift is directly proportional to the throughput so that the lifting movements of the throttling member 42 may be employed as an indirect measure for the change in throughput. Due to the flow-favouring formation of the described constructional elements forming the relieving chamber, the valve according to the invention has no harmful dead spaces and is particularly free from wear.

For the practical choice of the shape of the curve of the inner member of the valve and of the throttling member, which elements define the relieving chamber, one starts from the operating conditions which the reducing valve is to satisfy. From the known throughput equations is found the maximum annular entry area $F_1$. The smallest cross-sectional area $F_2$ of the passage through the inner member of the valve, which also represents the largest cross-sectional area of the relieving chamber at maximum lift, is given by means of a factor $x_{max}$ which states how often the pressure drop from initial pressure to final pressure is divisible by the critical pressure ratio. It is determined from the initial pressure, final pressure and critical pressure ratio. Thus the quotient from the initial pressure divided by the final pressure is equal to the reciprocal of the critical pressure ratio which is raised to the power of $x_{max}$. The area $F_2$ is now given by dividing $F_1$ by the pressure ratio raised to the power of $x_{max}$. The calculation of the inner wall of the inner member of the valve basically proceeds from the cross-sectional area $F_2$. The internal cross-sectional area of the inner member increases up to the maximum cross-sectional area $F_{y\ max}$ in the upper end of the inner member according to the equation $$Fy = F_2(2 - P_k^x)$$

By substitution of $x_{max}$ for $x$ there is obtained $F_{y\ max}$; by substitution of values of $x$ between zero and $x_{max}$ the intermediate areas $F_y$ are calculated. The points of the curve are given from the areas $$F_2 = F_{y\ min} \text{ to } F_{y\ max}$$

by finding the respective radii.

The generatrix of the throttling member which is identically curved is found in an analogous manner.

The influence of the type of the medium the pressure of which is to be reduced upon the shape of the curve is expressed in the critical pressure ratio which according to the known principles of thermodynamics is dependent upon the ratio of the specific heats.

In a further development of the invention the valve may advantageously be employed also for the cooling of vapours by arranging inlets (not shown) for an injected liquid to open into the relieving chamber, preferably in the neighborhood of the valve seat. These inlets may be provided as slits or apertures distributed around the periphery of the inner wall of the inner member 43 of the valve, these slits or apertures being either arranged in groups above or beside one another or being uniformly distributed. Naturally, the use of such a construction of valve is not limited to the cooling of vapours but may serve generally for the mixing of two flowing media. Due to the ejector action thereby set up in the relieving chamber, the conveyance of the injected medium and the thorough mixing thereof with the flowing medium will be much facilitated.

In the foregoing there have been described the application of the valves according to the invention exclusively in relation to speeds of flow approaching or equal to the speed of sound and the advantages resulting from such use. It is however also possible to employ the proposed valve for the production of supersonic speeds when it is a question of furnishing a stream of gas or vapour practically free from turbulence and compression shocks, for example for wind tunnels.

It has been found that the reducing valves according to the invention are suitable not only for the throttling of gases and vapours but also for the relieving of fluids which are under high pressure down to atmospheric pressure.

The described advantages of the relieving chamber according to the invention may also be achieved if the throttling member and/or the inner wall of the inner member of the valve are provided with groove-like turnings.

I claim:

1. A reducing valve for flowing media comprising valve body means having a contoured flow passage therethrough, a throttling member movable axially in said flow passage and having a convex outer surface tapering progressively inwardly toward the end thereof, said flow passage being defined in part by a concave inner surface on said valve body means having a configuration complementary to the exterior convex outer surface of the throttling member and said flow passage including an orifice opening, the end of the throttling member being movable through said orifice opening to engage the convex outer surface of the throttling member with the adjacent surface of said valve body means to prevent flow of media through the flow passage, and being movable away from the orifice to permit media flow in the annular space between the throttling member and the concave inner surface of the valve body means, said convex surface of the throttling member and said concave inner surface of said valve body means being formed so that at each position of opening of the throttling member, adjacent transverse cross-sectional areas of the annular space between the throttling member and valve body means spaced at equal distances apart along the axis of the throttling member bear a constant ratio to each other.

2. A reducing valve as in claim 1 wherein said throttling member is disposed in said flow passage and is movable to close the flow passage in the same direction as the flow of media and is movable in a direction opposite to the flow of media to open the flow passage.

3. A reducing valve as in claim 1 wherein said throttling member, in the valve-closed position, projects beyond the narrowest transverse cross section of the orifice opening in the direction of media flow, a distance equal to that of the full length of stroke of the throttling member.

(References on following page)

References Cited by the Examiner

UNITED STATES PATENTS

| | | | |
|---|---|---|---|
| 1,449,873 | 3/1923 | Steuber | 251—122 X |
| 1,919,232 | 7/1933 | Lee | 251—127 X |
| 1,970,726 | 8/1934 | Barrett | 251—122 |
| 2,114,858 | 4/1938 | Rosch | 251—122 |
| 3,013,767 | 12/1961 | De Haven | 251—122 |

FOREIGN PATENTS

| | | |
|---|---|---|
| 194,866 | 1/1958 | Austria. |
| 515,953 | 12/1952 | Belgium. |
| 541,969 | 6/1957 | Canada. |

M. CARY NELSON, *Primary Examiner.*

J. DEATON, L. KAMPSCHROR, S. SCOTT,
*Assistant Examiners.*